United States Patent [19]

Darche

[11] 4,335,884
[45] Jun. 22, 1982

[54] DEVICE FOR ENSURING DYNAMIC TIGHTNESS, PARTICULARY FOR STIRLING ENGINE

[75] Inventor: Michel Darche, Les Marronniers, France

[73] Assignee: Societe ECA, Asnieres, France

[21] Appl. No.: 159,686

[22] Filed: Jun. 16, 1980

[30] Foreign Application Priority Data

Jun. 18, 1979 [FR] France ............................... 79 15537

[51] Int. Cl.³ ............................................... F02G 1/04
[52] U.S. Cl. ......................................... 277/3; 60/517; 60/521; 74/18.2
[58] Field of Search ...................... 277/3; 60/516, 517, 60/521; 74/18.2

[56] References Cited

U.S. PATENT DOCUMENTS

| | | | |
|---|---|---|---|
| 3,004,421 | 10/1961 | Cowans | 60/517 |
| 3,812,677 | 5/1974 | Greis | 60/517 |
| 3,914,940 | 10/1975 | Bergman | 60/521 |
| 3,996,745 | 12/1976 | Davoud et al. | 60/517 |

FOREIGN PATENT DOCUMENTS

2160871 12/1971 Fed. Rep. of Germany.

Primary Examiner—Robert I. Smith
Attorney, Agent, or Firm—Offner and Kuhn

[57] ABSTRACT

The invention relates to a device for insuring the tight seal of a closed space filled with a gas at high pressure through one wall of which an outlet rod is positioned, said outlet rod being subject to reciprocating rectilinear movement. Between the walls of the closed space and the outlet rod, two dynamic seals and a rolling diaphragm are successively positioned. Between these two seals, the outlet rod has a shoulder such that in combination with two non-return valves, it acts as a pump which sucks the gas from the chamber formed by the intermediate seal and the rolling diaphragm and delivers this gas to the closed space, thereby maintaining a relatively low pressure on the rolling diaphragm despite leakage of the seals and valves. This invention is particularly applicable to Stirling engines.

6 Claims, 5 Drawing Figures

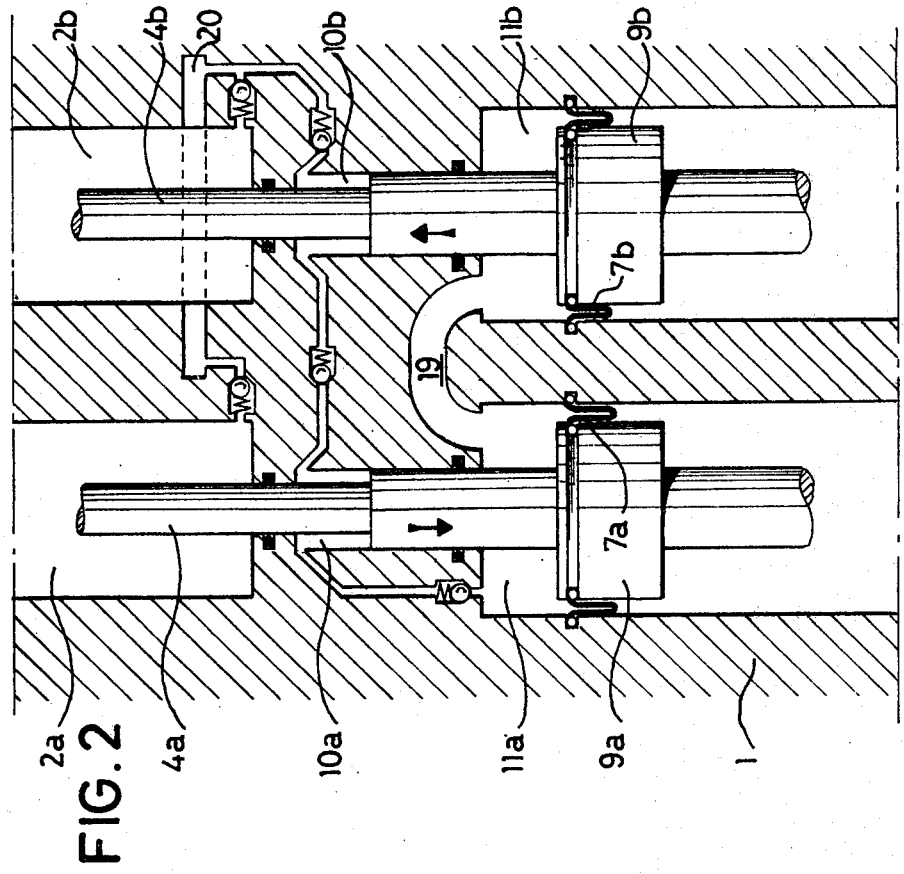
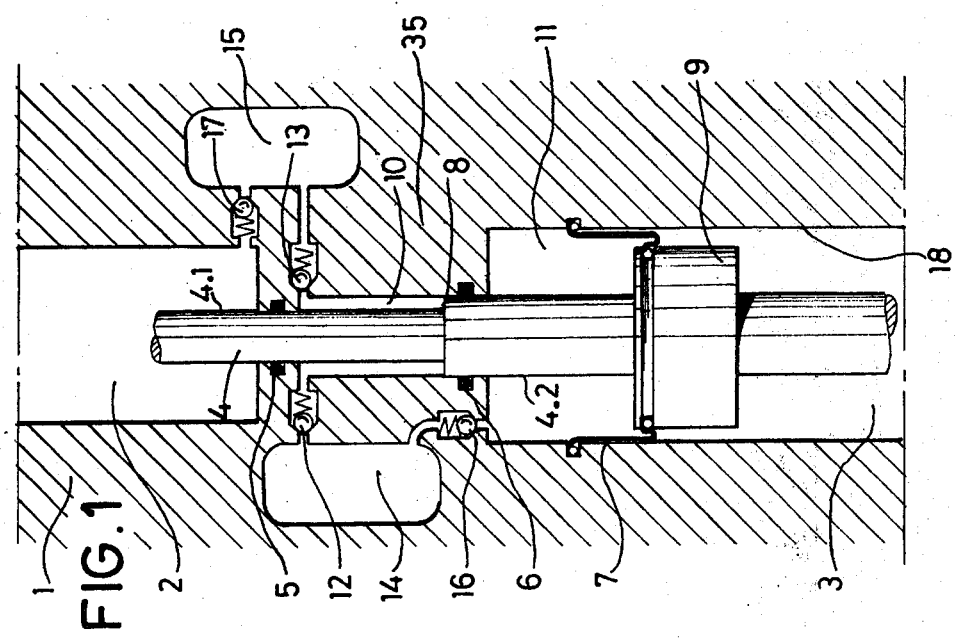

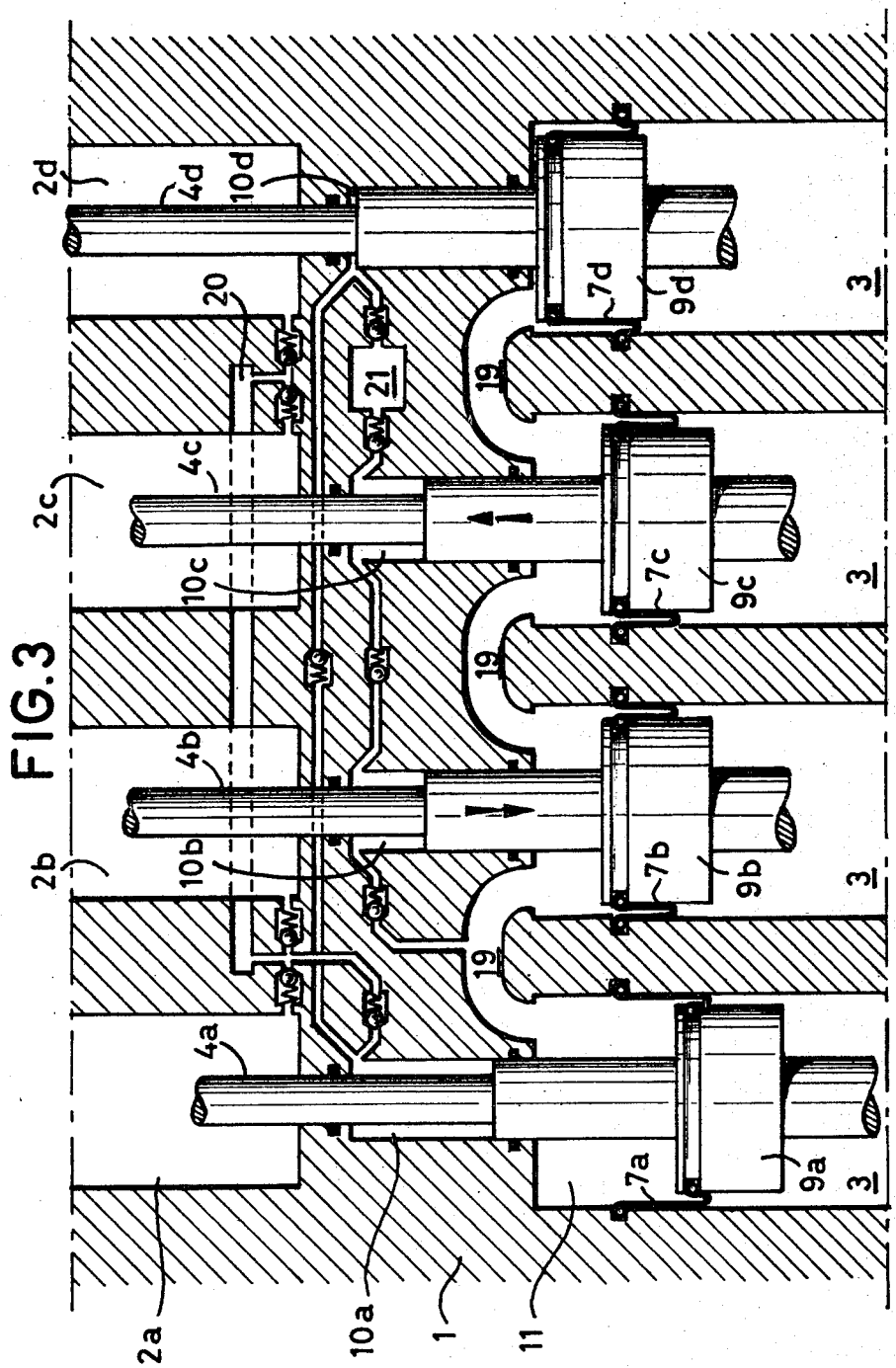

DEVICE FOR ENSURING DYNAMIC TIGHTNESS, PARTICULARY FOR STIRLING ENGINE

BACKGROUND OF THE INVENTION

This invention relates to a device for insuring the tight seal of closed space filled with a gas at high pressure and more particularly insuring a tight seal where there is an outlet rod through one wall forming the closed space such as in Stirling engines.

In mechanical apparatus, "closed" spaces are frequently encountered in which a vacuum has been created or which has been filled with a fluid having considerable differences in pressure with respect to medium outside the closed space. Such a space may be form from an assembleage of pieces or members which may have openings which may be sealed by doors, stoppers or like members. In the present state of the art, absolute tightness between these pieces, which are static with respect to one another, may be obtained due to seals of various types, whatever the pressure variation and nature of the fluid.

It is a different matter when the space comprises a mechanical outlet, i.e. an opening allowing the passage of a rod, piston or transmission shaft animated by a movement of rotation or of translation with respect to the space. In such a dynamic system, if the pressure variation is other than slight or if one or more of the fluids either in or outside the space is not highly viscous (i.e. a light gas), the seals to properly work must be so tight as to exert a pressure against the mobile faces of the joint with a risk of blocking the moving rod or shaft or alternating causing rapid deterioration of the seal may be used, but, if there is a pressure variation greater than a few tens of bars or if the fluid is not very viscous, such as a light gas, such a considerable tightening force must be exerted between the mobile faces of the joint that there is a risk of blocking the transmission shaft or causing rapid deterioration of the seal.

In the case of a transmission shaft in rotation, the best compromise is obtained by a mechanical packing in which the mobile faces in contact are in a plane perpendicular to the axis of rotation with a perfectly adjusted contact pressure. The leak of a fluid such as an oil at a pressure which may attain about a hundred bars is then extremely reduced. However, this arrangement, which already is not absolutely tight, is not applicable to a transmission shaft or rod in translation.

In this latter case, solutions are known which ensure tightness under certain conditions. Various types of supple, impermeable diaphragms are employed, constituted by thin metal materials or possibly reinforced elastomers and having the form of a surface of revolution; one of the edges of the surface is hermetically mounted on the transmission rod; the other edge of the surface is hermetically mounted on the opening of the space. The movements of translation in question are obviously reciprocating movements of limited stroke. The necessary movement of the diaphragm and its resistance to pressure are obtained by undulations judiciously disposed on a base form which may be a flat, circular or a diaphragm, conical or cylindrical bellows.

Another well-known advantageous arrangement is the rolling diaphragm or "sock" in which the diaphragm works solely in traction by rolling and abutting alternately, in the course of the movement, on the rod or on the bore made in the space. This arrangement is particularly advantageous to obtain a movement of considerable stroke with a seal of reduced dimensions.

However, these various hermetic solutions can be used in practice only for a pressure variation not exceeding a few tens of bars. In addition, the rolling diaphragm is destroyed by fatigue after a relatively low number of operational cycles, this giving it a very limited life if the reciprocating movement is of high frequency and with a considerable pressure variation.

A solution has already been found for the Stirling engine by a Dutch laboratory, and numerous Patents have been filed on the subject. This laboratory employs the rolling diaphragm described hereinabove, but applied to a liquid cushion; the diaphragm does not separate the working gas contained in the engine directly from the gaseous outside medium, with a pressure difference which should be able to attain 50 to 200 bars, but it separates it from a certain quantity of oil with a pressure variation of only about 5 bars; said quantity of oil is itself separated from the outside medium by a conventional dynamic seal as indicated hereinabove, supporting the considerable pressure variation. Arrangements are made for the volume offered to the oil in the course of the reciprocating movement to be constant. Under these conditions, a rolling diaphragm may, according to this laboratory, withstand two billion cycles. In addition, other precautions must be taken. To compensate for the oil volume variations due to the slight leakages of the dynamic seal, to the variations in temperature and to the absorption of gas by the oil, it is necessary to use a non-reinforced elastic rolling diaphragm and a pressure regulator must be installed, such as an adjusting valve, as well as a small high pressure oil pump which may be the dynamic seal operating as "pumping ring".

BRIEF SUMMARY OF THE INVENTION

It is an object of the invention to insure such a dynamic seal in a system of the type described where there is reciprocating movement of above ten cycles per second and where there is high pressure variation which may attain several hundred bars. Such seals are particularly important in situations where absolute tightness are necessary to prevent dangerous gases, such as hydrogen or other explosive gases, or expensive gases such, as helium, from leaking. It finds particular application in the Stirling engine for eliminating any leakage of the working gas and any oil which would be detrimental for the regenerators of the engines.

The present invention relates to a novel device with respect to the rolling diaphragm on liquid cushion, which retains the rolling diaphragm but avoids the use of oil and its drawbacks, without being more complex.

It is an object of the present invention to provide a device for ensuring dynamic tightness, comprising a rolling diaphragm, for a closed space filled with a gas at high pressure (constant or cyclically variable), from which an outlet rod animated by a reciprocating longitudinal slide movement emerges into the outside medium. A partition through which the rod passes is disposed between the closed space and the rolling diaphragm and forms with the latter a chamber of a variable volume, said chamber being connected to the closed space via a pump actuated by the reciprocating movement of the rod and maintaining the gaseous pressure in the chamber at a value much lower than that of the closed space, but always greater than that of the outside medium. These known arrangements make it possible for the rolling diaphragm to function under the best conditions, with a reduced pressure difference and, when the closed space has a high temperature, at a much lower temperature. The technical manufacturing stresses of the rolling diaphragm are thus attenuated and its life increased.

The device further comprises, disposed successively along the rod from the closed space towards the outside medium, two dynamic seals such as O-rings, reinforced or non-reinforced rings, slotted gaskets, packings, etc . . . placed between the rod and the bore passing through the partition, then the rolling diaphragm, with the second dynamic seal, defining the chamber and ensuring the absolute tightness thereof with respect to the outside medium.

According to the invention, the part of the rod by which the latter penetrates in the closed space presents a reduced cross section and is connected with the part emerging from the partition towards the outside medium by a shoulder, this latter and the bore of the partition forming the piston and the cylinder of said pump, of which the inner enclosure, of variable volume, surrounded by the two above-mentioned dynamic seals, which are immobile, is connected by a suction conduit, with the interposition of at least one non-return valve, to the chamber and, by a delivery conduit with the interposition of a first non-return valve, a small auxiliary space and a second non-return valve, to the closed space. The device therefore ensures the recovery of the leakages occurring at the two dynamic seals and at the non-return valves. Moreover, the small auxiliary space improves the efficiency of pumping by lowering the ratio of the extreme suction and delivery pressures, as the pressure in this space is established at a substantially constant value equal to the minimum pressure in the closed space.

A small auxiliary space connected to the chamber via a non-return valve opening in the direction of suction, may also be interposed in the suction conduit. The pressure in this space remains substantially equal to the maximum pressure in the chamber.

To ensure that the device continues to function temporarily in the case of the rolling diaphragm tearing, the rolling diaphragm may be provided to be separated from the outside medium by a partition comprising an abundantly lubricated dynamic seal preceded by an oil scraper seal, the accumulation of oil above the dynamic seal being prohibited due to an evacuation pipe connected to an oil/gas separator constituted by a tank with a float comprising a needle valve.

A multiple device may be made, formed by the association of a plurality of devices according to the invention with a view to ensuring the tightness of a plurality of connected closed spaces, of which the outlet rods make reciprocating movements phase-shifted cyclically with respect to one another. In this case, the chambers of the different devices all communicate with one another by short, wide conduits, and the pumps are mounted in series, with the interposition of non-return valves and of at least one small buffer space if the number of associated devices is more than two, and form a multi-stage pump which ensures the suction in the chambers and the delivery in the individual closed spaces via an admission pipe connected to each closed space through a respective non-return valve, the minimum pressure in the course of a cycle of functioning thus being identical for all the closed spaces and for example twenty times greater than that prevailing in the chambers, above the rolling diaphragms. The intercommunicating chambers may further be connected, through a valve (such as a push valve with spring) to a cylinder of gas under mean pressure, itself connected, through another valve, to an exhaust pipe opening into each closed space through a respective non-return valve. The assembly is such that, by placing the cylinder of gas in communication with the chambers, by one of the two valves, the pressure in the cylinder is reduced and the pressure in the chambers and, through the pumps, the pressure in the closed spaces, is increased, the minimum pressure in the course of a cycle in the closed spaces remaining for example twenty times greater than the pressure in the chambers, above the rolling diaphragms. By placing the closed spaces in communication with the gas cylinder, by the other valve, the value of the maximum pressure in the course of a cycle in the closed spaces is reduced and the pressure in the cylinder is increased. A valve for placing the admission pipe and the exhaust pipe in communication may further be provided, especially in the case of application to a Stirling engine to enable the torque furnished thereby to be varied.

THE DRAWINGS

The features set forth above, as well as other features hereinafter described, will be better understood from the following description given with reference to the accompanying drawings in which the preferred embodiments of the invention are shown, given by way of illustration and not of limitation, in the drawings:

FIG. 1, is a schematic view of a device for insuring dynamic tightness in accordance with the present invention as applied to one closed space with a single corresponding sliding rod with reciprocating movement.

FIG. 2, similarly shows the device used in conjunction with two closed spaces with opposite reciprocating movements.

FIG. 3, is a schematic diagram showing the use of the device with four closed spaces with reciprocating movements shifted by 90° with respect to one another such as encountered in a Stirling engine.

DETAILED DESCRIPTION OF THE PREFERRED EMBODIMENT

Figure 4:
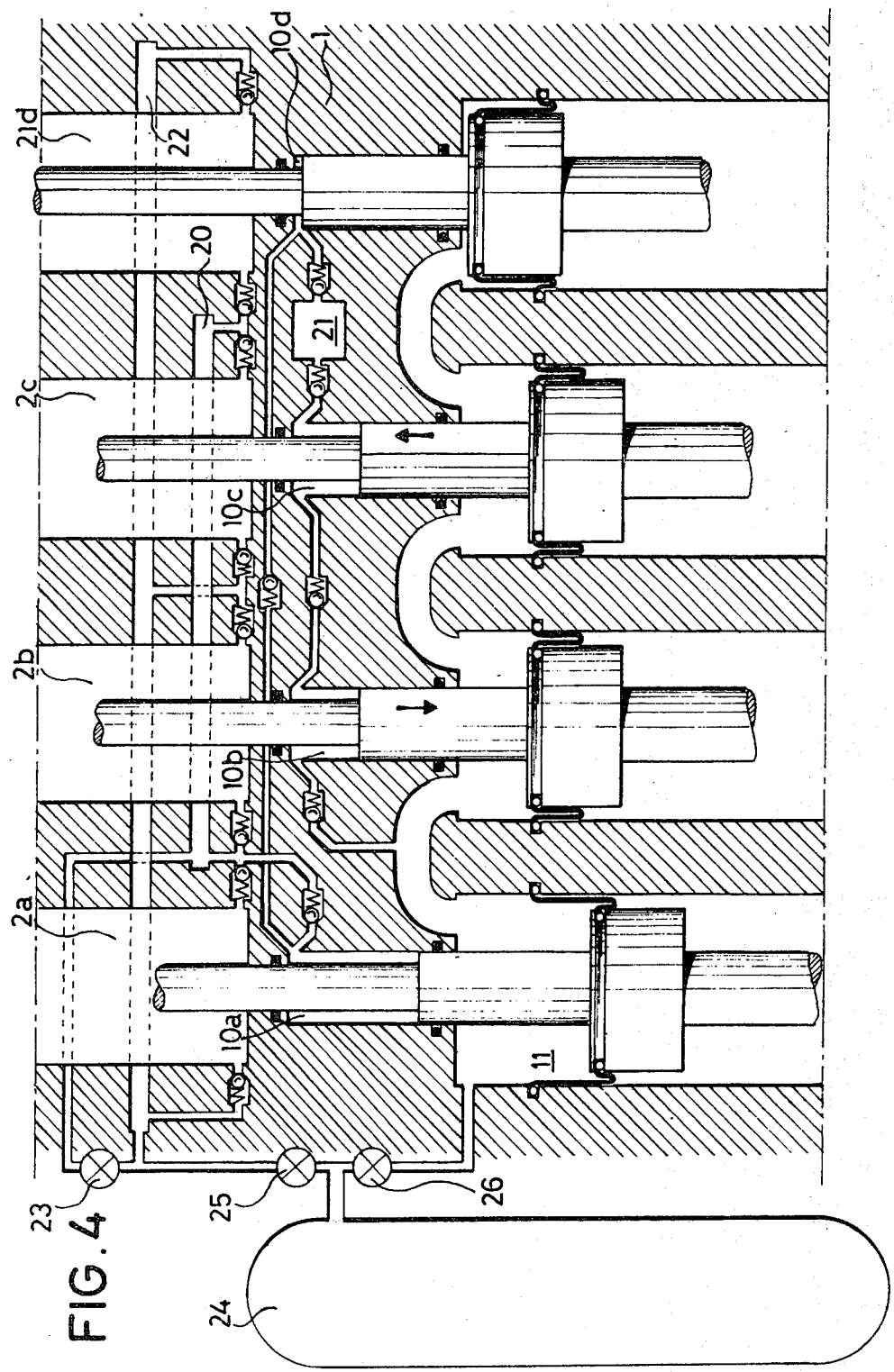
FIG. 4, shows a schematic diagram of a multiple cavity device such as shown in FIG. 3 with a separate fluid supply.

Referring now to the drawings, FIG. 1 shows, in the body 1 of the device, a closed space 2, shown partially, containing a gas at high pressure which must be prevented from leaking towards the outside medium 3 despite the reciprocating slide at high frequency of a rod penetrating into the space 2 through a partition 35.

To this end, and according to an arrangement of the invention, the body 1 is provided, along the rod 4, successively from the closed space 2 to the outside medium 3, with a conventional dynamic seal 5, such as an O-ring, a reinforced or non-reinforced ring, a slotted gasket or a packing, with a similar second dynamic seal 6 and with a rolling diaphragm 7. The rod 4 comprises between the two dynamic seals 5,6 a shoulder 8 separating a part 4.1 by which it penetrates into the space 2 and a part 4.2 of larger diameter, fast with a piston 9 serving as guide member and sliding in a bore 18. Between the wall of the latter and the piston is disposed the annular rolling diaphragm 7. An enclosure 10 of variable volume has thus been constituted between the two dynamic seals 5,6, and a chamber 11 of variable volume between the intermediate seal 6 and the piston 9.

At the end of the enclosure 10 located towards the dynamic seal 5 of smallest diameter cooperating with the part 4.1 of the rod 4, are provided two orifices each equipped with a non-return valve 12, 13, for example with ball and spring. The two valves function in opposite directions so that the part 4.2 of the rod 4 and the enclosure 10 constitute the piston and the cylinder of a suction pump (by valve 12) and delivery pump (by valve 13). The valve 12 communicates the variable volume enclosure 10 with the variable volume chamber 11 when the first is in depression with respect to the second, via a small space 14 and a non-return valve 16 functioning in the same sense as valve 12. The valve 13 communicates the variable volume enclosure 10 with the closed space 2 when the first is in excess pressure with respect to the second, via a small space 15 and a non-return valve 17 functioning in the same direction as the valve 13.

It is seen that the device ensures a perfect tightness, due to the rolling diaphragm 7, between the space 2 and the outside medium 3.

In operation, the pressure above the diaphragm 7 is maintained at a much lower value than that prevailing in the space 2, as will be specified hereinafter.

Let $V_{11\,min}$ and $V_{11\,max}$ be the extreme volumes of the variable volume chamber 11. The variations in volume in the course of the reciprocating movement of the rod 4 and of the piston 9 being made at high frequency, it may be considered that there are no heat exchanges with the body 1 of the device and that the compression and expansion of the gas contained in this chamber are adiabatic. Under these conditions, the ratio of the extreme pressures $P_{11\,min}$ and $P_{11\,max}$ of this gas is given by the well known equation:

$$P_{11\,max}/P_{11\,min} = (V_{11\,min}/V_{11\,max})^\gamma$$

with $\gamma = 1.40$ for hydrogen and air,
$\gamma = 1.67$ for helium.

The same applies to the gas contained in the variable volume enclosure 10 and:

$$P_{10\,max}/P_{10\,min} = (V_{10\,min}/V_{10\,max})^\gamma = K$$

The functioning of the four non-return valves 12, 13, 16 and 17 ensures that, between the pressures of the gas contained in the various enclosures 2, 10, 11, 14 and 15, the following equations apply:
$P_{2\,min} \geq P_{15}\ P_{15} \geq P_{10\,max}\ P_{10\,min} \geq P_{14}\ P_{14} \geq P_{11\,max}$, therefore $$P_{11\,max} \leq P_{2\,min}/K$$

By adjusting the ratio between the two extreme volumes of the enclosure 10 to a sufficiently high value, as low a pressure as is desired may be obtained above the rolling diaphragm 7, in the chamber 11. However, $P_{11\,min}$ must be at least equal to the pressure $P_3$ of the outside medium 3 for the diaphragm always to be stretched.

Further to the slight but inevitable leakages of gas which occur at the dynamic seals 5 and 6 and at non-return valves 12, 13, 16 and 17, the minimum pressure in the closed space 2 tends to decrease and the maximum pressure in the chamber 11 tends to increase. When their ratio reaches the value K, the boxed-in relation above shows that they can no longer vary.

In the double device of FIG. 2, the minimum pressures, in the course of an operational cycle, in the two closed spaces $2a$ and $2b$ are assumed to be equal and the reciprocating movements of the two rods $4a$ and $4b$ are assumed to be opposite. Under these conditions, the enclosures $10a$, $10b$ of the two small pumps may be mounted in series, as shown in the FIG., so as to make a two-stage pump. The two chambers $11a$ and $11b$ have volumes varying in opposition; by placing them in communication by a short conduit 19 of wide section to avoid pressure drops, a constant total volume is obtained in which the pressure of the gas circulating from one to the other is constant.

It is then possible to eliminate the intermediate space 14 and the intermediate valve 16 of FIG. 1. Only an intermediate space 20 corresponding to the space 15 of FIG. 1 is provided.

If the extreme volumes of the two pumps are the same, then $$P_{10a\,max}/P_{10a\,min} = P_{10b\,max}/P_{10b\,min} = K$$

as indicated previously.

The various non-return valves are disposed, as shown in the FIG. so as to ensure the following relations:

$P_{2a\,min} \geq P_{20}\ P_{2b\,min} \geq P_{20}\ P_{20} \geq P_{10b\,max}\ P_{10b\,min} \geq P_{10a\,max}\ P_{10a\,min} \geq P_{11a} = P_{11b} = P_{11}$.

Therefore, $$P_{11} \leq P_{2a\,min}/K^2 \text{ and } P_{11} \leq P_{2b\,min}/K^2$$

The leakages tend to reduce $P_{2a\,min}$ or $P_{2b\,min}$ and to increase $P_{11}$. As soon as $P_{11} = P_{2a\,min}/K^2 = P_{2b\,min}/K^2$, the pressures no longer vary.

The embodiment and functioning of the quadruple device of FIG. 3 will be readily understood. The minimum pressures in the course of an operational cycle are assumed equal in the four closed spaces $2a, 2b, 2c$ and $2d$. The four rods $4a, 4b, 4c, 4d$ have reciprocating movements phase-shifted by 90° with respect to one another in order a-b-d-c, so that the enclosures $10a, 10b, 10c$ and $10d$ have variable volumes phase-shifted by 90° in the same order. The various chambers 11 communicate with one another by wide conduits 19. The four small pumps constituted by the enclosures 10 and their non-return valves are mounted in series in order b-c-d-a and between the enclosures $10c$ and $10d$, of which the volumes do not vary in phase opposition but phase-shifted by 90°, a small space 21 is interposed which performs the same role as the space 14 of FIG. 1. There is one space 20 only, connected as admission pipe to the four spaces $2a, 2b, 2c$ and $2d$.

The functioning of the ten valves of the device (cf. the Figure) gives, as before:

$P_{10b\,min} \geq P_{11}\ P_{10c\,min} \geq P_{10b\,max}\ P_{21} \geq P_{10c\,max}$ $P_{10d\,min} \geq P_{21}\ P_{10a\,min} \geq P_{10d\,max}\ P_{20} \geq P_{10a\,max}$ $P_{2a\,min} \geq P_{20}\ P_{2b\,min} \geq P_{20}\ P_{2c\,min} \geq P_{20}\ P_{2d\,min} \geq P_{20}$ If the extreme volumes of the four enclosures 10 are the same, then, as indicated previously:

$$P_{10b\ max}/P_{10b\ min} = P_{10c\ max}/P_{10c\ min} = P_{10d\ max}/P_{10d\ min} = P_{10a\ max}/P_{10a\ min} = K.$$

These various relations result in $$P_{11} \geq P_{2a\ min}/K^4 \quad P_{11} \leq P_{2b\ min}/K^4 \quad P_{11} \leq P_{2c\ min}/K^4 \quad P_{11} \leq P_{2d\ min}/K^4$$

Further to the slight but inevitable leakages of gas which occur at the various dynamic seals and non-return valves of the device, the pressures $P_{2a\ min}$, $P_{2b\ min}$, $P_{2c\ min}$ and $P_{2d\ min}$ tend to decrease and the pressure $P_{11}$ tends to increase. At the limit, $$P_{11} = P_{2a\ min}/K^4 = P_{2b\ min}/K^4 = P_{2c\ min}/K^4 = P_{2d\ min}/K^4$$

The minimum pressures in the various closed spaces 2 become equal and constant; the pressure in the various chambers 11 is constant; all the above inequalities become equalities.

The ratio K may be chosen to be sufficiently large for the pressure $P_{11}$ to be as low as desired. For a better resistance to wear of the rolling diaphragms 7, a pressure greater by about 5 to 6 bars than the pressure of the outside medium 3 will preferably be taken.

Such a device ensuring dynamic tightness is particularly suitable for a Stirling engine with double-acting cylinders. The spaces 2a, 2b, 2c and 2d are the low temperature compression chambers of the Stirling engine. The space 20 is the admission pipe of the engine. The cylinders may be disposed in line, in V, U or in barrel form. They may be any number of them, higher than three but preferably an even number to reduce the number of buffer space 21, viz. one for four cylinders and two for six cylinders.

With respect to the device already known and indicated hereinabove which uses a rolling diaphragm, the device according to the invention has the advantage of employing only conventional components such as non-return valves and dynamic seals; in addition, the rolling diaphragm is used under better conditions by application on a piston with a much larger diameter than the rod of the Stirling piston; it operates in a perfectly cold region of the engine (a resistance to wear and tear has been measured on rolling diaphragms which is 100 times greater at 20° C. than at 100° C.); it is not necessarily elastic, as it does not operate on a liquid cushion and it may be reinforced; it does not risk being attacked by the oil of a liquid cushion.

The high pressure which is attained in the enclosure 10a of the last stage of the multiple pump creates a disturbing torque on the drive 4a; but, on the one hand, its effect is partially compensated by that of the pressure in the enclosure 10d, on the other hand it acts only on a very small surface; its effect is no greater than that which results from the normal functioning of the engine.

When the apparatus, such as a Stirling engine, is stopped, the dynamic seals continue to leak and the pressure above the rolling diaphragms 7 rises to attain, after a very long period of time, a value equal to that of the closed spaces 2. This drawback is eliminated with the device described hereinafter.

The device shown in FIG. 4, is identical to the preceding one (FIG. 3), but comprises an additional arrangement which uses the quality of tightness and the integration of each small pump to allow the adjustment of the pressure in the closed spaces 2. If the apparatus is a Stirling engine, its power may thus be varied.

The various closed spaces 2a, 2b, 2c, and 2d each comprise a second non-return valve for communication with a common exhaust pipe 22. This valve functions in opposite direction to that of the first valve ensuring the connection to the inlet pipe 20. Such an exhaust pipe constitutes a known arrangement in the Stirling engines to ensure that the maximum pressure in the various cylinders does not become greater than a given value of adjustment.

Another known arrangement is the by-pass valve 23 which enables the maximum pressure pipe 22 to be placed in communication with the minimum pressure pipe 20 by an adjustable leakage channel. There is generally the possibility on the Stirling engines of causing the torque to drop rapidly, although with a poor yield, and of annulling it or, to a certain extent, of reversing it.

An additional arrangement according to the invention consists in a cylinder 24 containing, in principle, the same gas as the rest of the apparatus, which may be placed in communication, by a valve 25 such as a push valve with spring, controlled manually or electrically, with the maximum pressure pipe 22 or, by an identical valve 26, with chambers 11.

Numerical values given solely by way of example will clearly show how the device of FIG. 4 functions in an application to a Stirling engine.

Before it is started up, the engine contains a gas which may be air at atmospheric pressure, or 1 bar. The cylinder 24 contains the working gas, hydrogen or helium, at a pressure of 35 bars for example.

When the engine is started up, the push valve 26 is pressed. The gas passes into the chambers 11 and, through the enclosures 10b, 10c, 10d and 10a of the pumps, into the spaces 2a, 2b, 2c and 2d. If the push valve 26 is released, a certain pressure $P_{11}$ is established in the chambers 11.

If the volumetric ratio of each small pump is for example equal to 1.54, a quantity of gas is introduced into the closed spaces 2a to 2d such that the minimum pressure in the course of an operational cycle of the engine is, as has been seen hereinabove, $$P_{2\ min} = P_{2a\ min} = P_{2b\ min} = P_{2c\ min} = P_{2d\ min} = P_{11} \times (1,54)^{4\gamma}$$

or, with helium for which $\gamma = 1.67$, $$P_{2\ min} = 17.9\ P_{11}$$

The maximum pressure, depending on the characteristics of the Stirling engine in question, is for example:

$$P_{2\ max} = P_{2a\ max} = P_{2b\ max} = P_{2c\ max} = P_{2d\ max} = 1.7\ P_{2a\ min}, \text{ or } P_{2\ max} = 30.4\ P_{11}$$

If the push valve 26 is pressed for a sufficiently long time, the pressures in the cylinder 24 and in the chambers 11 become equalized and the flow of gas stops; or, in the example in question $$P_{11} = P_{24} = 8.4 \text{ bars,}$$

maximum pressure compatible with a good resistance to wear and tear of the rolling diaphragms. Then, in the engine:

$$P_{2\ min} = 150 \text{ bars} \quad P_{2\ max} = 255 \text{ bars}$$

The engine attains its maximum values of pressure and power.

If the push valve 25 is now pressed, the gas passes through the exhaust pipe 22 of the closed spaces 2a, 2b, 2c, 2d to the cylinder 24. The maximum and minimum pressures in the spaces 2 and the pressure in the chambers 11 decrease so that $P_{2\ min} = 17.9\ P_{11}$ and, assuming $P_{2\ max}/P_{2\ min}$ to be constant, $P_{2\ max} = 30.4\ P_{11}$.

If the push valve 25 is pressed for a sufficiently long time, the pressures in the cylinder 24 and in the pipe 22 become equalized and the flow of gas stops; or, in the example in question $$P_{2\ max} = P_{24} = 33.5 \text{ bars}$$

hence $$P_{2\ min} = 19.7 \text{ bars} \quad P_{11} = 1.1 \text{ bar}$$

The engine attains the minimum level of pressure and power. The pressure above the rolling diaphragms remains slightly higher than the atmospheric pressure so as to stretch them.

If the push valve 26 is pressed again, the pressure $P_{24}$ in the cylinder may be reduced again to 8.4 bars and $P_{11}$, $P_{2\ min}$ and $P_{2\ max}$ may be given their maximum values again.

In general, the pressures in the engine may of course always be increased, within the limits indicated, by pressing on the valve 26 and they may be lowered by pressing on the valve 25. At a given speed of rotation, the power of the Stirling engine, substantially proportional to the pressures, may thus be adjusted in a ratio of 1 to 7.6. In the case of the propulsion of a submarine where the necessary power varies as the cube of the speed of advance or of the speed of rotation of the engine, the power may vary in a ratio of 1 to 20 and the speed in a ratio of 1 to 2.7. If it is desired to develop a power lower than the minimum power obtained by action on the valve 25 or if it is desired to stop the engine, the by-pass valve 23 is actuated, as indicated hereinabove.

If it is desired to stop the engine for a long period of time, it is preferable to act firstly on the push-valve 25 and thus to recharge the cylinder 24 to 33.5 bars. Then the heating of the engine is cut off. Under these conditions, the various internal leakages of the engine will simply have for their effect to raise the pressure in the chambers 11, above the rolling diaphragms, to about 8 bars, i.e. to a pressure admissible for the diaphragms.

Figure 5:
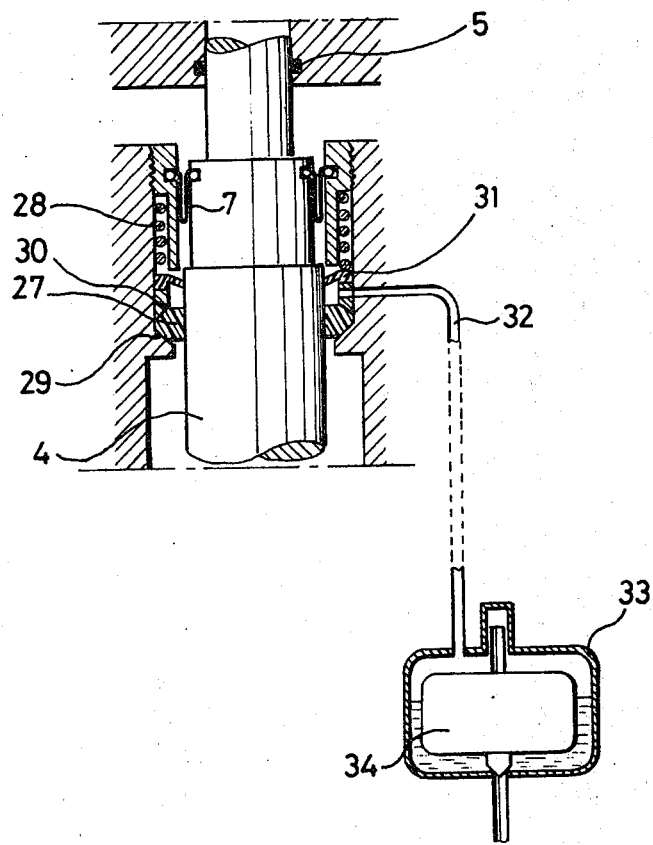
FIG. 5, shows a secondary seal which enables a certain amount of pressure to be maintained when the rolling diaphragm is torn.

The additional arrangement according to the invention, shown in FIG. 5, constitutes an operational safety measure in the case, which must be envisaged, of one of the rolling diaphragms 7 tearing. In fact, in this case, the leakages of gas through the various non-lubricated dynamic seals and the non-return valves of the device must be prevented from causing the power of the engine to drop too rapidly.

To this end, a part of the known sealing and guiding device, already applied in particular to the Stirling engine, is mounted beneath each rolling diaphragm. This device comprises a dynamic seal 27 abundantly lubricated by projections of oil on the rod 4 and tightened thereon by assembly with spring 28 and conical surfaces 29, 30 clearly visible in the Figure. This seal may centre and guide the rod 4 perfectly. Due to its lubrication, it gives a good tightness with respect to the helium and hydrogen.

The lubricating oil tends to rise and accumulate above the seal 27. A scraper seal 31 avoids the oil rising along the rod and, in the present example, arriving through a tear in the rolling diaphragm 7 and along the various circuits as far as the regenerators of the engine which it would risk clogging. The oil overflow flows through an orifice and a pipe 32. The pipes corresponding to the various cylinders of the engine lead to an oil-gas separator constituted by a tank 33 with a float 34 comprising a needle valve. When the oil rises in the separator beyond a certain level, the force of buoyancy of the float 34 becomes greater than the force of abutment on the needle valve due to the pressure of the gas and the oil flows in the oil sump without the gas escaping.

With respect to the use made thereof in Sweden, this device, which is not perfectly tight, is used within the scope of the invention only as a safety measure, when the rolling diaphragm is torn, and not under normal circumstances. In addition, in this emergency use, it works only with a pressure variation of about 8 bars and not of the order of 100 bars, and the leakages of gas become negligible.

What is claimed is:

1. In a device for ensuring dynamic tightness employing a first sealing means in each of an assemblage of closed spaces filled with gas at high pressure, each of said closed spaces having an outlet rod, with a reciprocating longitudinal sliding movement, emerging from the space into the outside medium, the movement of said sliding rods being cyclicaly phase shifted with respect to each other, comprising a partition through which the rod passes disposed between its respective closed space and its first sealing means and forming with the latter a chamber of variable volume which is connected to the closed space via a pump actuated by the reciprocating movement of the outlet rod which maintains the gaseous pressure in the chamber at a value much lower than that of the closed space, but always greater than that of the outside medium, disposed successively along the rod from the closed space towards the outside medium are two dynamic seals placed between the rod and the bore passing through the partition, the first sealing means with the second dynamic seal defining the chamber and ensuring the absolute tightness thereof with respect to the outside medium, the part of the rod which penetrates the closed space has a cross section, different from that of the part emerging from the partition towards the outside medium and is connected with the last part by a shoulder, the latter and the bore of the partition forming the piston and the cylinder of said pump, the pumps formed by these enclosures and non-return valves being series-connected so as to form a multistage pump the enclosure of the first pump being connected, via non-return valve mounted in the direction of the suction, to said chambers which are interconnected by short, wide ducts, and the enclosure of the last pump of the series being connected, via a non-return valve, to an auxiliary buffer space itself connected, via a respective non-return valve, to each of the closed spaces, the valves to which the said buffer space is thus connected being mounted in the direction of the gas discharge towards the closed spaces.

2. A device for insuring dynamic tightness in accordance with claim 1 wherein there are more than two closed spaces and there is a buffer space positioned between two of said cylinders.

3. A device according to claim 1, in which there is provided, between two of the series-connected pumps, in the case where they would not operate in phase opposition to one another, an auxiliary buffer space framed by two non-return valves mounted in the same direction.

4. A device according to claim 1, in which the first sealing means towards the outside is formed of a rolling membrane.

5. A device according to claim 1, wherein the chambers which communicate with one another are connected, through a valve, to a cylinder of gas under mean pressure, itself connected, through another valve, to an exhaust pipe opening into each closed space through a respective non-return valve.

6. A Stirling engine incorporating any of the devices according to claims 1, 3, 4 or 5.

* * * * *